United States Patent [19]
Ihara et al.

[11] Patent Number: 6,093,349
[45] Date of Patent: Jul. 25, 2000

[54] COLOR FILTER COMPOSITION

[75] Inventors: Masaru Ihara, Kanagawa; Katsutoshi Ohno, Tokyo; Kyoichi Yamamoto; Yoshiaki Shikata, both of Kanagawa; Tomoaki Nanbu, Tokyo, all of Japan

[73] Assignee: Sony Corporation, Tokyo, Japan

[21] Appl. No.: 09/265,616

[22] Filed: Mar. 10, 1999

Related U.S. Application Data

[62] Division of application No. 08/825,801, Apr. 2, 1997, Pat. No. 5,952,137.

[30] Foreign Application Priority Data

Apr. 4, 1996 [JP] Japan ..................... 8-082640

[51] Int. Cl.[7] ................ G02B 5/00; H01J 29/18
[52] U.S. Cl. ............ 252/584; 252/582; 430/27
[58] Field of Search ............ 430/7, 27; 252/582, 252/584; 136/400, 401, 425, 428, 430, 440, 453, 480

[56] References Cited

U.S. PATENT DOCUMENTS

| | | | |
|---|---|---|---|
| 5,560,964 | 10/1996 | Ohno et al. | 427/510 |
| 5,754,001 | 5/1998 | Ohno et al. | 313/497 |
| 5,838,106 | 11/1998 | Funada | 313/587 |
| 5,939,821 | 8/1999 | Itoh et al. | 313/461 |

Primary Examiner—John A. McPherson
Attorney, Agent, or Firm—Hill & Simpson

[57] ABSTRACT

A color filter composition, a color display device, and a production method of the same with which an increase of the luminance, an increase of the contrast, an increase in the range of color reproduction, and an improvement of the function for preventing reflection of outside light can be achieved. The color filter composition has a spectral characteristic allowing specific light of the visible region to pass therethrough and is composed of fine particles of an inorganic metal oxide containing 15 percent by weight or less of particles having a particle size of 0.1 $\mu$m or more based on the weight of all of the particles and contains 70 percent by weight or more of particles having a particle size of 0.01 $\mu$m to 0.07 $\mu$m based on the weight of all of the particles. A color filter is formed on an inner surface of a panel of a display device by screen printing or heat transfer printing by using this color filter composition.

11 Claims, 7 Drawing Sheets

SPECTRAL TRANSMITTANCE CURVE

DISTRIBUTION RATE OF OTHER
PARTICLES WHEN MOST FREQUENT
NUMBER OF PARTICLES IS
SET TO 100%

TRANSMITTANCE CHARACTERISTIC
OF FILTER OF EMBODIMENT

TRANSMITTANCE CHARACTERISTIC
OF FILTER OF CONVENTIONAL EXAMPLE

COLOR FILTER COMPOSITION

CROSS-REFERENCE TO RELATED APPLICATION

This Application is a Divisional of prior application Ser. No. 08/825,801, filed Apr. 2, 1997, now U.S. Pat. No. 5,952,137.

BACKGROUND OF THE INVENTION

1. Field of the Invention

The present invention relates to a color filter composition, a color display device, and a production method of same.

2. Description of the Related Art

In recent years, there has been much studies on differentiation of products through improvements in the performance of the color display device, represented by a vacuum fluorescent light emitting device (VFD), an electrofluorescent light emitting device (EL), a photodiode light emitting device (LED), and other image tubes or a plasma display device (PDP), a field emission display device (FED), a cathode ray tube (CRT), and other picture tubes and on a reduction of costs by reexamination of the mass production system.

In a CRT such represented by a Braun tube of a television set, an electron beam emitted from an electron gun strikes the surface of the layer of fluophors to energize the fluophor particles and cause emission of light for the display. The diversification of various kinds of visual apparatuses using CRTs accompanying the advances in the field of electronics in recent years has led to various improvements and developments.

For example, the fluophors used in the CRTs are improved in color purity by coating an inorganic pigment on the fluophor particles. However, since the coated pigment is adhered to the fluophor particles in state and not formed as a separate layer, the luminance of the emission of the fluophors has been lowered.

In order to compensate for this state, it may be considered to raise the output of the electron beam irradiated to the fluophor surface, but this method is liable to lead to a deviation in color due to the thermal expansion of the shadow mask and a reduction of the service life of the fluophors.

Further, a color display device provided with a color filter containing at least one type of metal compound of nickel and cobalt and also using a dye has been proposed (Japanese Unexamined Patent Publication (Kokai) No. 2-46403).

A dye filter, however, is insufficient in the heat resistance and light resistance, so a sintering step cannot be used and thus it is used in a laminated glass system. Further, a color display device of this dye filter system cannot be used for the purpose of an outdoor video apparatus.

Also, in the process for production of a color CRT having a fluophor surface on the inner surface of a face plate, there is known a process for production of a CRT equipped with a color filter wherein a ultrafine particle pigment dispersion is coated on the inner surface of a face plate made of glass to form a pigment layer and then a fluopher suspension is further coated to form a laminate layer, then collective exposure via the shadow mask and development for patterning (photolithography) are carried out.

Nevertheless, this photolithography method has disadvantages of the throughput and stability. Namely, a UV crosslinking type vehicle (PVA/ADC-base) has a pot life, so it is impossible to avoid a coarsening of the pigment due to an aging by a dark reaction. This leads to a reduction of the workability due to the frequency of exchange of the dispersions and a poor stability of the quality (deterioration of transmittance).

Further, a difficult point at the time of coating of the laminate layers of the color filter and the fluophor layer has been the fact that an upper coating layer (10 $\mu$m≦fluophor thick film) invades a lower coating layer (3 $\mu$m≧color filter thin film) due to a double coating by the same vehicle-base. Accordingly, it is hard to obtain a good layer-separated coating film, which has led to a fluctuation in the quality.

Further, in such a color display device equipped with the color filter, for improvement of the contrast, it is necessary to raise the coloring density of the color filter. Since coarse particles of 1 $\mu$m or more are mixed in and also the distribution of the particle size is wide at the conventional pigment dispersion level, the transmittance of light is degraded. Thus there has been a limit to raising the contrast and increasing the color reproduction range.

SUMMARY OF THE INVENTION

An object of the present invention is to provide a color filter composition, a color display device, and a production method of the same with which an increase of the luminance, an increase of the contrast, an increase of the color reproduction range, and an improvement of the ability to prevent reflection of outside light can be achieved in a color display device.

To attain the above object, the color filter composition according to the present invention has a spectral characteristic allowing specific light of the visible region to pass therethrough and comprises fine particles of an inorganic metal oxide containing 15 percent by weight or less of particles having a particle size of 0.1 $\mu$m or more based on the weight of all of the particles and containing 70 percent by weight or more of particles having a particle size of 0.01 $\mu$m to 0.07 $\mu$m based on the weight of all of the particles.

Preferably, the light transmittance of the light absorbing region of the color filter composition after sintering is 20 percent or less, and the light transmittance of the light transmission region is 50 percent or more.

Preferably, the inorganic metal oxide contains at least one of iron oxide, titanium oxide, nickel oxide, cobalt oxide, zinc oxide, aluminum oxide, and chromium oxide. For example, as the red color filter composition, preferably $Fe_2O_3$ is contained. As the green color filter composition, $TiO_2$—NiO—CoO—ZnO or CoO—CrO—$TiO_2$—$Al_2O_3$ is preferably contained. As the blue color filter composition, preferably CoO—$Al_2O_3$ is contained.

The color display device according to a first aspect of the present invention is a color display device comprising a transparent panel; a red fluophor layer, a green fluophor layer, and a blue fluophor layer provided on an inner surface of the transparent panel and respectively emitting lights of red, green, and blue by irradiation of an energy beam; and a color filter which is provided between one of the fluophor layers and the transparent panel and has a high transmission property in a wavelength region of specific light of the visible region, wherein the color filter includes fine particles of an inorganic metal oxide containing 15 percent by weight or less of particles having a particle size of 0.1 $\mu$m or more based on the weight of all of the particles and containing 70 percent by weight or more of particles having a particle size of 0.01 $\mu$m to 0.07 $\mu$m based on the weight of all of the particles.

A color display device according to a second aspect of the present invention is a color display device comprising a transparent panel; three types of color filters which are provided on the inner surface of the transparent panel with a predetermined pattern and respectively selectively allow lights of red, green, and blue to pass therethrough; and single color fluophor layers which are provided on the inner surface of the three types of color filters and emit a single type of light by the irradiation of an energy beam, wherein the color filters include fine particles of an inorganic metal oxide containing 15 percent by weight or less of particles having a particle size of 0.1 μm or more based on the weight of all of the particles and containing 70 percent by weight or more of particles having a particle size of 0.01 μm to 0.07 μm based on the weight of all of the particles.

The production method of the color display device according to the first aspect of the present invention is characterized in that screen printing is carried out by using the color filter composition to form the color filter layer and the fluophor layer on the inner surface of the panel. Further, this production method is characterized in that no-colored fluophor is used which emits single color fluorescence. Namely, this production method is characterized in that it comprises the steps of screen printing three types of color filters which respectively selectively allow the lights of red, green, and blue to pass therethrough on the inner surface of the transparent panel with a predetermined pattern and forming a single color fluophor layer emitting a single type of light by irradiation of the energy beam on the inner surface of the three types of color filters by the screen printing, fine particles of an inorganic metal oxide containing 15 percent by weight or less of particles having a particle size of 0.1 μm or more based on the weight of all of the particles and containing 70 percent by weight or more of particles having a particle size of 0.01 μm to 0.07 μm based on the weight of all of the particles being contained in a pigment paste for screen printing the color filters.

The production method of the color display device according to the second aspect of the present invention is characterized in that heat transfer printing is carried out by using the color filter composition to simultaneously form the color filter layer and the fluophor layer formed on the inner surface of the panel. Namely, this production method comprises the steps of forming a peeling layer on the surface of a heat transfer use substrate sheet; forming a red fluophor layer, a green fluophor layer, and a blue fluophor layer respectively emitting the lights of red, green, and blue by irradiation of an energy beam on the surface of the peeling layer; forming three types of color filters which respectively selectively allow the lights of red, green, and blue to pass therethrough on the surfaces of the fluophor layers of the respective colors corresponding to the fluophor layers of the respective colors; forming a thermal sealing agent layer on the surface of the color filters to form a transfer sheet; and bringing the thermal sealing agent layer of the transfer sheet into close-contact with the transparent panel, performing the heat transfer printing, and forming the fluophor layer equipped with the color filters on the inner surface of the transparent panel, fine particles of an inorganic metal oxide containing 15 percent by weight or less of particles having a particle size of 0.1 μm or more based on the weight of all of the particles and containing 70 percent by weight or more of particles having a particle size of 0.01 μm to 0.07 μm based on the weight of all of the particles being contained in a pigment paste for forming the color filters.

If a color filter of a color display device is formed by using the color filter composition according to the present invention, since the filter composition is comprised by the inorganic metal oxide, it is excellent in heat resistance and the filter layer is not deteriorated even at the time of the production of a CRT or other color display device accompanied with a heat treatment step of about 500° C. Further, in the present invention, since the color filter is comprised by fine particles of an inorganic metal oxide, the transmittance of the obtained color filter is improved and also the luminance is improved. For this reason, it becomes possible to raise the coloring density of the color filter, which contributes to the increase of the contrast and an increase of the color reproduction range.

In the present invention, by forming the color filter and the fluophor layer by the screen printing or the heat transfer printing, a laminate structure in which the color filter and the fluophor layer are well separated is obtained, the luminance of the emission of the fluophors is not lowered, and the image quality is improved and, at the same time, there is a contribution to the stability of the quality of the color display device.

BRIEF DESCRIPTION OF THE DRAWINGS

These and other objects and features of the present invention will become clearer from the following description of the preferred embodiments made with reference to the attached drawings, in which.

DESCRIPTION OF THE PREFERRED EMBODIMENTS

Figure 1:
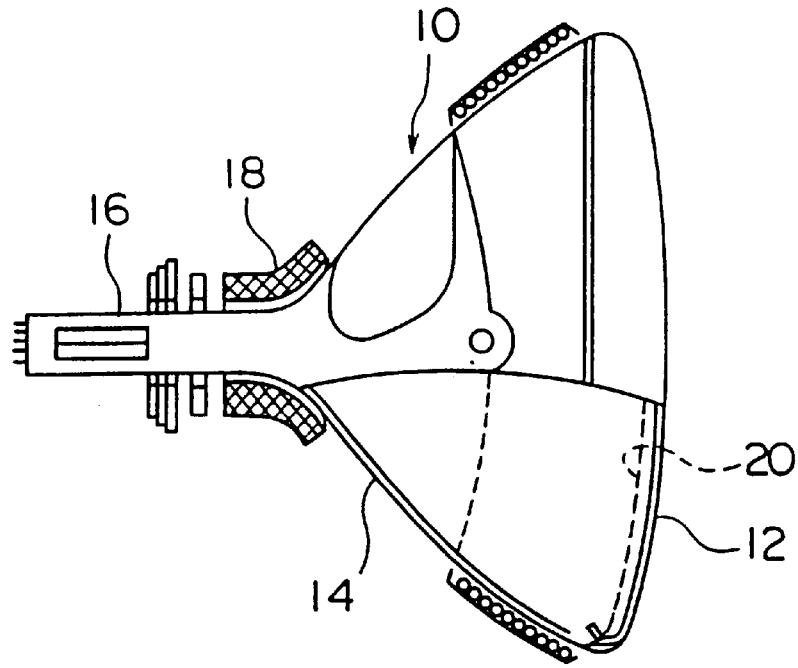
FIG. 1 is a schematic view of a color CRT according to an embodiment of the present invention.

Below, a color filter composition, color display device, and production method according to the present invention will be explained in detail based on the embodiments shown in the drawings.

First Embodiment

The embodiment shown in FIG. 1 is obtained by applying the present invention to a color CRT as a color display device.

As shown in FIG. 1, a color CRT 10 of the present embodiment has a panel glass 12 in which a fluophor surface is formed on the inner surface and funnel glass 14 which is bonded to this panel glass and in which an electron gun 16 is accommodated in a neck portion. An electron beam emitted from the electron gun 16 is biased by a biasing yoke and strikes the fluophor surface through an aperture grill 20 serving as the shadow mask mounted on the inner surface side of the panel glass 12 to cause emission.

The panel glass 12 is comprised by a glass having a high light transmittance (for example 90 percent or more transmittance) having a fluophor surface formed on the inner surface thereof. As the panel glass having a high light transmittance, use is made of a panel glass obtained by adhering a safety panel of a high transmittance to the surface of a glass panel of a high transmittance. As the panel glass of the high transmittance, more specifically, use can be made of a combination of a clear safety panel (EIAJ code JS520AA01) with a tint panel (EIAJ code JP520AG11) made by Nihon Denki Itagarasu Corp.

Figure 2:
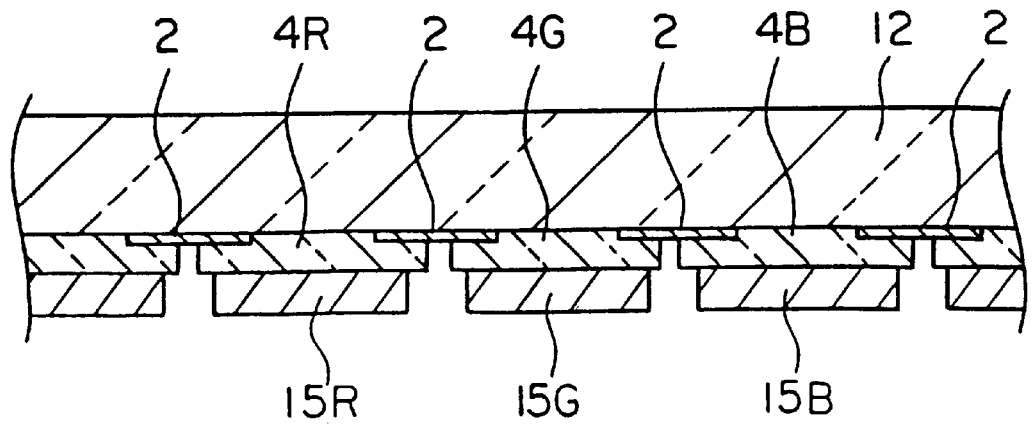
FIG. 2 is a sectional view of principal parts of an inner surface of a panel shown in FIG. 1.

As shown in FIG. 2, in the present embodiment, black stripes (carbon stripes) 2 are formed on the inner surface of the panel glass 12 at predetermined intervals. A red (R) fluophor layer 15R, a green (G) fluophor layer 15G, and a blue (B) fluophor layer 15B are alternately arranged between these stripes 2 in this order. These fluophor layers 15R, 15G, and 15B are covered by for example an aluminum film (illustration omitted).

In the present embodiment, between the fluophor layers 15R, 15G, and 15B and the panel glass 12, a red color filter 4R, a green color filter 4G, and a blue color filter 4B having a high transmittance in a wavelength region of lights of the respectively corresponding colors are mounted.

The red color filter 4R is comprised by a color filter composition which contains as a main component $Fe_2O_3$ as the inorganic metal oxide and contains 15 percent by weight or less of particles having a particle size of 0.1 $\mu m$ or more based on the weight of all of the particles and contains 70 percent by weight or more of particles having a particle size of 0.01 $\mu m$ to 0.07 $\mu m$ based on the weight of all of the particles. The green color filter 4G is comprised by a color filter composition which contains as a main component $TiO_2$—NiO—CoO—ZnO (1:1:1:1) and contains 15 percent by weight or less of particles having a particle size of 0.1 $\mu m$ or more based on the weight of all of the particles and contains 70 percent by weight or more of particles having a particle size of 0.01 $\mu m$ to 0.07 $\mu m$ based on the weight of all of the particles. The blue color filter 4B is comprised by a color filter composition which contains as a main component CoO—$Al_2O_3$ (1:1) and contains 15 percent by weight or less of particles having a particle size of 0.1 $\mu m$ or more based on the weight of all of the particles and contains 70 percent by weight or more of particles having a particle size of 0.01 $\mu m$ to 0.07 $\mu m$ based on the weight of all of the particles.

The thickness of the color filter d is not particularly limited, but is preferably 0.1 $\mu m \leq d \leq 3.0$ $\mu m$, more preferably about 0.5 $\mu m \leq d \leq 2.0$ $\mu m$. If the film thickness d is less than 0.1 $\mu m$, the effect of improvement of the contrast due to the provision of the filter cannot be expected and it becomes difficult to obtain a filter having a uniform film thickness as a whole, while if the film thickness d exceeds 3.0 $\mu m$, the reduction of the luminance becomes large. Neither of these is desirable.

Figure 3A:
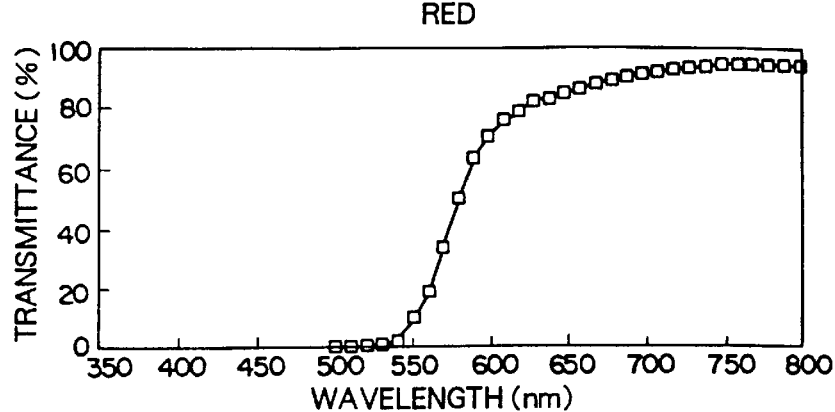
FIGS. 3A to 3C are views showing spectral transmittance characteristics of a red, green and blue color filters respectively according to an embodiment of the present invention.
Figure 3B:
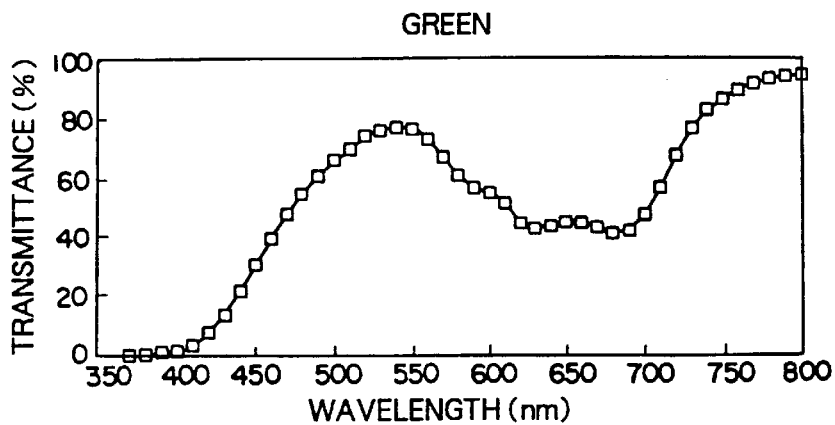
Figure 3C:
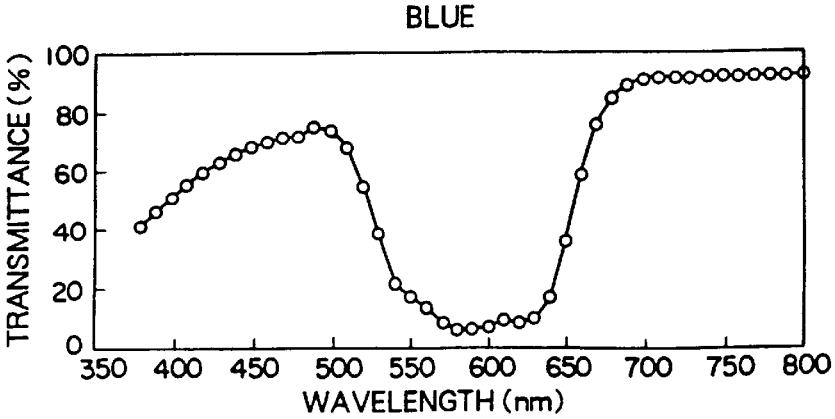

FIG. 3A shows a curve of the spectral transmittance of the red color filter 4R, FIG. 3B shows a curve of the spectral transmittance of the green color filter 4G, and FIG. 3C shows a curve of the spectral transmittance of the blue color filter. In these filters, as shown in FIGS. 3A to 3C, the light transmittance of the light absorbing region is 20 percent or less, and the light transmittance of the light transmission region is 50 percent or more.

In the present embodiment, it is desired in obtaining a better chromaticity and luminance that a layer represented by the following general formula be used as the red (R) fluophor layer 15R for combination in the above filter:

A:B where, A is $Y_2O_2S$, $Y_2O_3$, or a mixture of the same and B is Eu or a mixture of Eu and Sm, where the Eu concentration [Eu] in the fluophor layer is represented as 0.1 mol % $\leq$ [Eu] $\leq$ 6.0 mol %.

More specifically, there are a fluophor layer containing a yttrium-oxi-sulfide as a main crystal and containing europium as an additive, a fluophor layer containing the yttrium-oxi-sulfide as the main crystal and containing europium and samarium as the additives, and so on.

Most desirably, as the red fluophor layer 15R, use is made of a fluophor layer represented by the above general formula in which the Eu concentration [Eu] is 2.8 mol % $\leq$ [Eu] $\leq$ 4.7 mol % and the film thickness d of the red color filter is determined as 0.5 $\mu m \leq d \leq 2.0$ $\mu m$.

As the green fluophor layer 15G, use is made of a fluophor layer containing for example zinc sulfide as the main crystal and containing copper, aluminum, etc. as additives. As the blue fluophor layer 15B, for example, use is made of a fluophor layer containing zinc sulfide as the main crystal and silver or the like as the additive.

Next, in the present embodiment, one example of a method of providing the fluophor surface on the inner surface of the panel glass is shown.

First, the black stripes 2 shown in FIG. 2 comprised by carbon black or the like as a substance not emitting light but absorbing light are formed. In the formation of the black stripes 2, the panel glass is washed and a photo resist comprised of a photosensitive agent and a water-soluble polymer such as a polyvinyl alcohol (PVA) is coated on the inner surface of the panel glass 12. This is dried to form a resist coating film. Next, the predetermined part of the resist coating film is cured by exposure using the mask.

Next, the unexposed part of the resist coating film is removed by development. The result is dried to form stripes of resist coating film. Then a carbon black suspension is coated on the entire surface of the panel glass. This is then dried and then a reversal solution is coated and the surface is developed and dried, thereby to form black stripes 2 made of carbon black. Note that it is also possible to simultaneously form the black stripes 2 together with the color filter and the fluophor layer by the heat transfer printing mentioned later.

To form the color filter and the fluophor layer on the inner surface of the panel glass by the heat transfer printing, first a transfer sheet is formed. So as to form the transfer sheet, a peeling layer is formed on the surface of a substrate sheet for heat transfer. On the surface of this peeling layer, the red fluophor layer 15R, the green fluophor layer 15G, and the blue fluophor layer 15B emitting the lights of red, green, and blue mentioned before are formed with a predetermined pattern. Next, the three types of color filters 4R, 4G, and 4B which respectively selectively allow the lights of red, green, and blue to pass therethrough are respectively formed on the surfaces of the fluophor layers 15R, 15G, and 15B of the respective colors with the patterns corresponding to the fluophor layers of the respective colors. Next, a thermal sealing agent layer is formed on the surfaces of the color filters 4R, 4G, and 4B to complete the transfer sheet.

The thermal sealing agent layer of this transfer sheet is brought into close contact with the transparent panel glass 12 and heat transfer printing is performed to form and a fluophor layer equipped with the color filters on the inner surface of the panel glass 12 as shown in FIG. 2.

After the fluophor layers of the three colors of red, green, and blue are formed in this way, an intermediate film is formed on them. The intermediate film is comprised by an organic film, flattens the fluophor surface, and facilitates the coating of the aluminum thin film layer as the metal thin film layer in the later steps. After the prebaking and the baking treatment at the frit sealing in the later step, the intermediate film is removed together with the PVA etc. through the aluminum film.

Thereafter, an aluminum thin film layer serving as the metal thin film layer is coated on the intermediate film. By forming the aluminum thin film layer, the luminance of the display screen is improved and ionization can be prevented.

Thereafter, the prebaking is carried out, the aperture grill is mounted on the inner surface of the panel glass, and then the seal edge face of the panel glass and the seal edge face of the funnel glass are frit seal-bonded. It is also possible to perform the prebaking after mounting the aperture grill. By this prebaking and the baking treatment (heat treatment) at the frit sealing, the components of the intermediate film and the organic component contained in the fluophor stripes (fluophor layer) are removed from the fluophor surface through the aluminum film and the coating film of the fluophor surface is fixed.

In the present embodiment, since the filter composition is comprised by an inorganic metal oxide, it is excellent in the heat resistance. The filter layer is not deteriorated even at the time of production of a CRT or other color display device etc. accompanied with a heat treatment step of about 500° C. Further, in the present embodiment, since the color filter is comprised by fine particles of an inorganic metal oxide, the transmittance of the obtained color filter is improved and also the luminance is improved. For this reason, it becomes possible to raise the coloring density of the color filter which contributes to the increase of the contrast and increase of the color reproduction range.

Further, by forming the color filter and the fluophor layer by the heat transfer printing, a laminate structure in which the color filters 4R, 4G, and 4B and the fluophor layers 15R, 15G, and 15B are well separated as layer is obtained, and the luminance of the emission of the fluophors is not lowered, the image quality is improved and, at the same time, there is a contribution to the stability of the quality of the CRT.

Second Embodiment

Next, an explanation will be made of an embodiment applying the present invention to a color flat screen display device utilizing field emission type microcathodes as the color display device.

Figure 4:
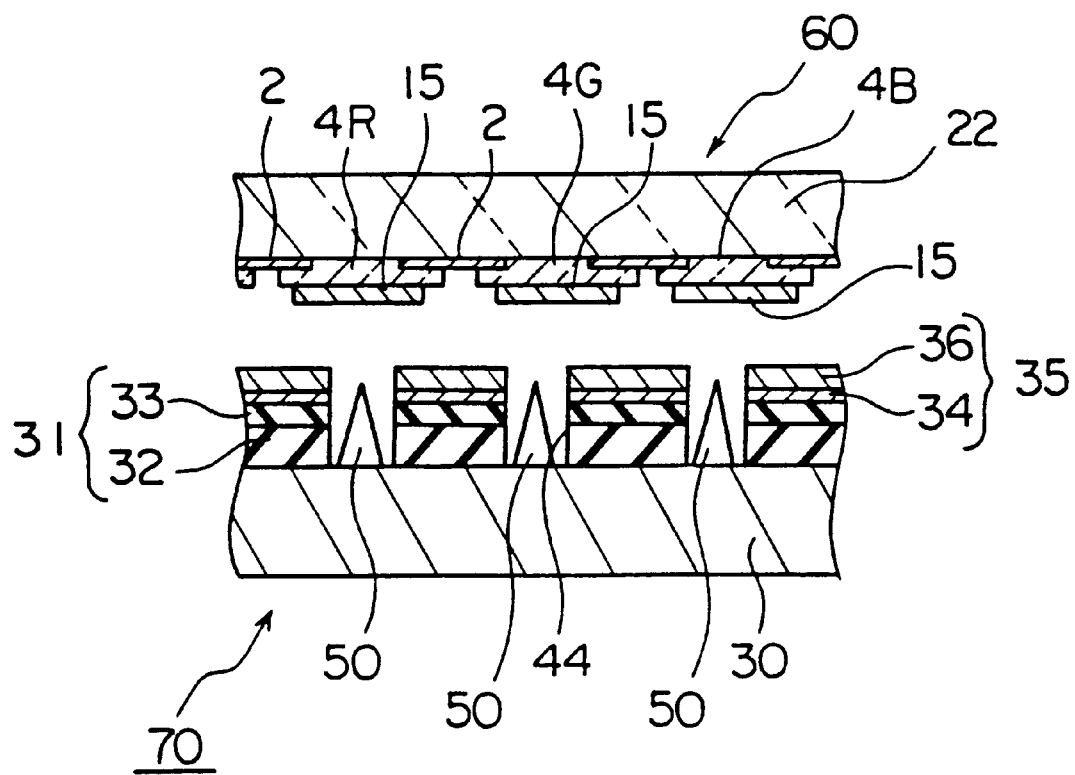
FIG. 4 is a sectional view of the principal parts of a color flat screen display device according to another embodiment.

As shown in FIG. 4, a color flat screen display device 60 of the present embodiment is a display device which performs the image display by irradiating electron beams emitted from a plurality of field emission type microcathodes 50 arranged on a semiconductor substrate 30 in the form of a matrix by scanning to a fluophor surface formed on the inner surface of a transparent panel 22 such as a glass substrate to cause emission of light. The space between the semiconductor substrate 30 and the transparent substrate 22 is held at a high vacuum. On the fluophor surface formed on the inner surface of the transparent panel 22, black stripes 2 and color filters 4R, 4G, and 4B similar to those of the embodiment shown in FIG. 2 are formed, but the fluophor layer 15 is constituted by a single color fluophor layer 15 emitting not three types of colors, i.e., R, G, and B. but a single type of light. Further, the formation of the color filters 4R, 4G, and 4B and the single color fluophor layer 15 is different from the first embodiment in the point that the screen printing is used. The single color fluophor layer 15 is not particularly limited, but ZnO:Zn emitting for example a blue green color may be used.

Next, one example of the method for producing the microcathodes 50 on the semiconductor substrate 30 will be explained.

In the present embodiment, first, an insulation layer 31 and gate electrodes 35 are sequentially formed on the semiconductor substrate 30. As the semiconductor substrate 30, for example, a single crystal silicon substrate is used.

In the present embodiment, the insulation layer 31 is constituted by a main insulation layer 32 and a hydrogen-containing layer 33. The main insulation layer 32 is comprised by silicon oxide formed by for example a CVD process, while the hydrogen-containing layer 33 is comprised by a hydrogen-containing silicon oxide formed by plasma CVD performed subsequent to the CVD for forming the main insulation layer 32. The main insulation layer 32 comprised by the silicon oxide film is formed by CVD under for example the following conditions. The conditions are as follows: as the CVD material gas, $SiH_4$ and $O_2$ are used, the flow ratio of $SiH_4/O_2$ is for example 300/300 SCCM, the atmospheric pressure is for example 300 Pa, the substrate temperature is for example 400° C., and the film forming time is for example 4 minutes. The film thickness of the main insulation layer 32 is for example 0.8 $\mu$m.

Subsequently, the hydrogen-containing layer 33 comprised by a hydrogen-containing silicon oxide film to be formed by the plasma CVD is formed by plasma CVD of for example the following conditions. As the plasma CVD material gas, $SiH_4$ and $O_2$ are used, the flow ratio of $SiH_4/O_2$ is for example 400/300 SCCM, the atmospheric pressure is for example 300 Pa, the substrate temperature is for example 350° C., and the film forming time is for example one minute. The film thickness of this hydrogen-containing layer 33 is for example 0.2 $\mu$m.

The gate electrodes 35 are not particularly limited, but in the present embodiment, use is made of a "polycide" film, that is, a laminate film of an n conductive polycrystalline silicon film 34 and a tungsten silicide (WSix) film 36. The gate electrodes 35 act as the grid of for example the microcathodes. Note that, the step of forming an emitter electrode to be formed on the surface of the semiconductor substrate 30 has been omitted.

The thickness of the polycrystalline silicon film 34 is for example 100 to 300 nm. The thickness of the tungsten silicide film 36 is for example 150 to 300 nm. The polycrystalline silicon film 34 and the tungsten silicide film 36 are formed by for example CVD. The polycrystalline silicon film 34 is formed under for example the following conditions. As the plasma CVD material gas, $SiH_4$ and $PH_3$ are used, the flow ratio of $SiH_4/PH_3$ is for example 500/0.3 SCCM, the atmospheric pressure is for example 100 Pa, and the substrate temperature is for example 500° C. The tungsten silicide film 36 is formed under for example the following conditions. As the plasma CVD material gas, $WF_6$, $SiH_4$, and He are used, the flow ratio of $WF_6/SiH_4/He$ is for example 3/300/500 SCCM, the atmospheric pressure is for example 70 Pa, and the substrate temperature is for example 360° C.

Next, a resist film is formed on this tungsten silicide film 36. Openings are formed in this resist film with a predetermined pattern corresponding to the cathode holes by the photolithography process. The inside diameters of these openings correspond to the inside diameters of the cathode holes and for example are about 0.8 μm. The resist film is not particularly limited, but for example a novolac-based g-line use resist can be used.

Next, the semiconductor substrate 30 on which this resist film is formed is placed in for example a general plasma etching device, where the etching is carried out by using the resist film 38 as a mask. The plasma etching device is not particularly limited, but for example a microwave electron cyclotron resonance (ECR) plasma etching device, an inductively coupled plasma (ICP) etching device, a helicon plasma etching device, a transcoupled plasma (TCP) etching device, etc. can be exemplified.

First, by using for example an ECR etching device, the tungsten silicide film 36 and the polycrystalline silicon film 34 are continuously etched under the following conditions.

As the etching gas, a gas mixture of $Cl_2$ and $O_2$ is used. The flow ratio of $Cl_2/O_2$ is determined to be for example 75/5 SCCM. The atmospheric pressure is for example 1.0 Pa. Further, the microwave power is for example 900 W, the high frequency (RF) power is for example 50 W (2 MHz), and the substrate temperature is for example 20° C.

Subsequently, the insulation layer 31 is subjected to the etching. At the etching, for example, an ECR type plasma etching device is used. The etching conditions thereof are shown below.

As the etching gas, a gas mixture of $CHF_3$ and $CH_2F_2$ is used. The flow ratio of $CHF_3/CH_2F_2$ is determined to be for example 45/5 SCCM. The atmospheric pressure is for example 0.27 Pa. Further, the microwave power is for example 1200 W, the high frequency (RF) power is for example 225 W (800 kHz), and the substrate temperature is for example 20° C.

Conventionally, by the continuous etching of such a multiple layer film, the resist film 38 retreats due to an excessive overetching of the high energy conditions. The side walls of the openings 40 are also shaved and the tungsten silicide film 36 located in the lower layer thereof is partially etched, thereby forming a tapered shape. The reason for this is considered to be that the gate electrodes 35 and the insulation layer 31 are subjected to the etching by the same resist film, therefore the time during which the resist film is exposed to the plasma etching becomes longer than that by the conventional etching technique for forming the contact holes. In the present embodiment, however, the hydrogen-containing layer 33 is provided in the insulation layer 31, therefore the hydrogen produced when the hydrogen rich (several tens of percent by weight) hydrogen-containing layer 33 is etched increases the C/F ratio near the holes 44 and forms a depositing atmosphere, whereby a fluorocarbon-based deposit as seen at the usual $SiO_2$ etching becomes the side wall protecting film and prevents the retreat of the photoresist. Accordingly, the overetching is not carried out up to the side walls of the openings of the gate electrodes 35. As a result, also a shoulder drop of the tungsten silicide film 36 etc. can be prevented, and cathode holes 44 having a good anisotropic shape can be formed.

Next, the resist film is removed by resist ashing. The resist ashing is carried out by using $O_2$ of for example 500 SCCM and under conditions of an atmospheric pressure of for example 3.0 Pa, a substrate temperature of for example 200° C., and a high frequency (RF) power of for example 300 W. In the step simultaneous with or after the time of removal of this resist film, also the side wall protecting film is removed.

Next, a peeling layer is formed on the tungsten silicide film 36 by using the electron beam vapor deposition process or the like. The peeling layer is comprised by for example an aluminum metal layer. The thickness of the peeling layer is not particularly limited, but is for example about 50 nm. The substrate angle at the time of the electron beam vapor deposition is preferably about 20 degrees (oblique incident vapor deposition). The atmospheric pressure is for example 1.0 Pa.

Next, by using for example the electron beam vapor deposition process, the cathode-forming layer is deposited on the peeling layer. As the cathode-forming layer, preferably molybdenum (Mo) is used, but it is also possible to use other high melting point metals or other metals and compounds. The angle of the substrate at the time of the electron beam vapor deposition is preferably for example about 90 degrees. By forming the cathode-forming layer to a thickness of for example about 1.0 μm on the surface of the substrate 30 located in the bottom portion of the cathode holes 44, acute angle conical cathodes 50 are formed with a uniform shape and height. The shapes of the cathodes 50, particularly the heights, depend upon the time until the openings of the cathode forming layer are closed. In the present embodiment, there is no taper and shoulder drop in the side walls of the openings of the tungsten silicide film 36, and therefore also the step coverage of the cathode-forming layer 48 becomes constant, the time until the openings 48a are closed is constant, and thus the shapes of the cathodes 50, particularly the heights, can be made uniform.

Next, wet etching (for example about 30 seconds) is carried out by fluoric acid having a ratio of water:fluoric acid of 5:1, the peeling layer comprised by aluminum or the like is removed by etching, and the cathode-forming layer located on this is lifted off. In the cathode holes 44, the microcathodes 50 having a uniform shape and height remain.

Thereafter, a transparent panel on which the fluophor surface is formed is adhered onto the substrate 30 in the vacuum state to form the flat screen display device of the present embodiment.

In the present embodiment, similar to the above embodiment, the color filter is comprised by fine particles of an inorganic metal oxide, therefore the transmittance of the obtained color filter is improved. In addition, in the color filter of the present embodiment, as shown in FIGS. 3A to 3C, the separability of the colors of red, green, and blue with respect to the light emitted from the common single color fluophor 15 is higher than that of the conventional filter, and as a result purer three primary colors can be obtained from the single color light. This contributes to the increase of the contrast and increase of the color reproduction range.

Further, by forming the color filters and the fluophor layer by the screen printing, a laminate structure in which the color filters 4R, 4G, and 4B and the fluophor layer 15 are well separated as layers is obtained, the luminance of the emission the fluophors is not lowered, the image quality is improved, and, at the same time, there is a contribution to the stability of the quality of the color flat screen display device.

Note that, the present invention is not limited to the above embodiments and can be modified in various ways within the scope of the present invention.

For example, the present invention is not limited to a CRT or a flat screen display device according to the above embodiments and can be applied to also a color cathode ray tube such as a flat CRT or other color display devices such as a plasma display.

Next, the present invention will be explained in more detail based on examples. Note that, in the following examples and comparative examples, parts and percents are based on weight unless otherwise specified.

EXAMPLE 1

A fluophor surface of a structure shown in the schematic sectional view of FIG. 2 was formed on a transparent panel glass 32 by screen printing. In the present example, however, the single color fluophor layer 15 was formed in place of the fluophor layers 15R, 15G, and 15B shown in FIG. 2.

First, on the transparent panel glass 12, black stripes 2 were formed according to an ordinary method.

Next, so as to form the color filters 4R, 4G, and 4B on the black stripes 2 by the screen printing, pastes of the respective colors were prepared.

(A) R (red) paste

A mixture of 34 parts of red pigment (DEFICR 1007 made by Dowa Kogyo Corp.) comprised of iron oxide ($Fe_2O_3$)-based ultrafine particles, 15 parts of a chemical absorbing type polymer dispersion agent (Solsperse (phonetic) made by ICI Corp.), and 51 parts of terpineol (Yasuhara Yushi Corp.) was finely dispersed by an annular type media dispersion machine (Diamond Fine Mill made by Mitsubishi Heavy Industries Ltd.) to obtain a mill base red having an intended particle size.

Figure 5A:
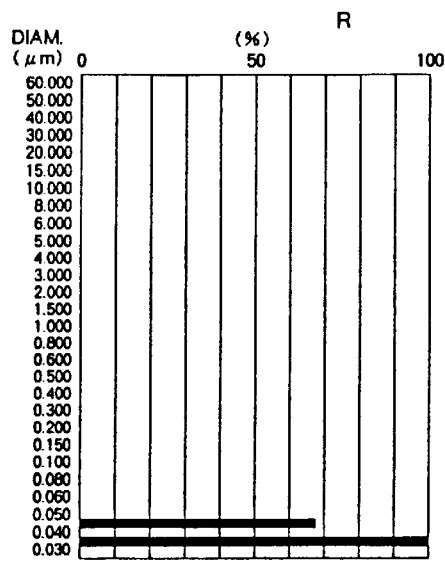
FIGS. 5A to 5C are graphs showing particle size distributions of the color filter composition according to an embodiment of the present invention.

Subsequently, 46 parts of varnish obtained by dissolving 4 parts of Etcell (phonetic) STD10 cps (ethyl cellulose made by Dow Chemical Corp.) in 42 parts of butyl diglycol acetate (made by Daicel Chemical Ltd.) by heating was added to 54 parts of the present mill base. These were mixed and dispersed by a triple-roll machine (made by Inoue Seisakusho Corp.). When the distribution of the particle size of the present paste was measured by a centrifugal precipitation type particle size distribution measurement unit (SA-CP3 made by Shimadzu Seisakusho Corp.), the result was an average particle size of 0.03 pm. Further, looking at the dispersion rate of the other particles when the most frequent number of particles (particle size: 0.035 μm) was set as 100 percent, the number of particles of 0.1 μm or more was 70 percent or more based on the number of all of the particles. The result of measurement of this particle size distribution is shown in FIG. 5A.

(B) B (blue) paste

A mixture of 37 parts of blue pigment (Dipyroxide TM Blue 3410 (phonetic) of Dainichi Seika Corp.) made of ultrafine particles of cobalt aluminate ($CoO$, $Al_2O_3$), 10 parts of a chemical absorption type polymer dispersion agent, and 53 parts of terpineol was finely dispersed by the same method as the production method of the R paste to obtain a mill base blue having the intended particle size.

Subsequently, 32 parts of varnish obtained by dissolving 5.6 parts of Etcell STD7 cps (ethyl cellulose made by Daicel Chemical Ltd.) in 26.4 parts of butyl diglycol acetate by heating was added to 68 parts of the present mill base blue. These were mixed and dispersed by a triple-roll machine.

Figure 5B:
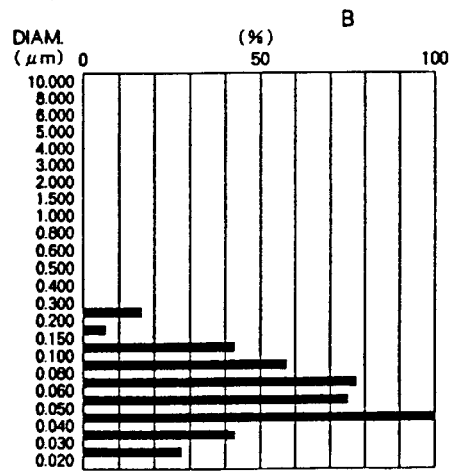

When the distribution of the particle size of the present paste was measured by the same method, the result was an average particle size of 0.05 μm. Further, the distribution rate of other particles when the most frequent number of particles (particle size: 0.045 μm) was set as 100 percent was equivalent to that of the R paste. The result of measurement of this particle size distribution is shown in FIG. 5B.

(C) G (green) paste

A mixture of 30 parts of green pigment (Dipyroxide TM Green 3320 (phonetic) made by Dainichi Seika Corp.) composed by ultrafine particles of $TiO$, $ZnO$, $CoO$, and $NiO$, 10 parts of a chemical absorbing type polymer dispersion agent, and 60 parts of terpineol was finely dispersed by the same method as the production method of the R paste to obtain a mill base green having an intended particle size.

Subsequently, 24 parts of varnish obtained by dissolving 76 parts of the present mill base and 3.8 parts of Etcell 10 cps in 20.2 parts of butyl diglycol acetate by heating was added to this. These were mixed and dispersed by a triple-roll machine.

Figure 5C:
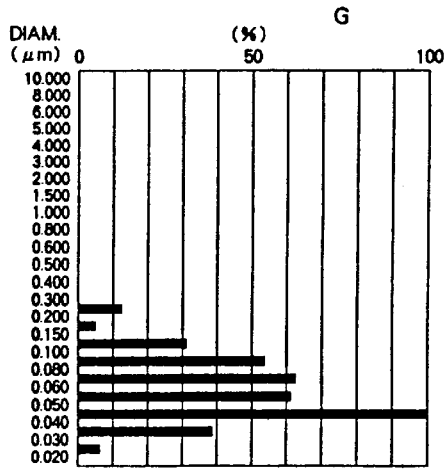

The distribution of particle size of the present paste was measured by the same method. As a result, the average particle size diameter was 0.06 μm. Further, the distribution rate of the other particles when setting the most frequency number of particles (particle size: 0.045 μm) as 100 percent was the same level as that of the R paste. The result of measurement of this particle size distribution is shown in FIG. 5C.

Mixing of printing suitability enhancement agent

In order to improve the screen suitability, use can be made of ultrafine particles of aluminum oxide (Aluminum Oxide C made by Nihon Aerosil Corp.) and calcium stearate (SC-100 made by Sakai Kagaku Corp.) as a rheology enhancement agent.

The screen printing suitability changes depending upon the mesh (opening size) of the screen, resist thickness, squeeze angle, printing pressure, printing speed, pattern precision, etc., and accordingly preferably also the rheology of the pigment pastes is appropriately controlled. A preferred value of the measurement value by a rheometer made by Rheometric Co. is shown below:

Steady-state viscosity: 200 to 800 Pa-S/25° C.

Complex elastic modulus: 5000 to 15000 dyne/$cm^2$

By performing the screen printing by using the above pigment pastes, as shown in FIG. 2, color filters 4R, 4G, and 4B were formed. At the time of the screen printing, a high precision low pressure screen printing machine made by Microtec Corp. was used. Further, at the time of the screen printing, the printing was performed on the surface of a panel glass 12 equipped with BM stripes (light shielding layer) 2 so that the B, R, and G adjoin different colors from each other.

Next, on these color filters, the single color fluophor layer 15 was formed by the screen printing by using a fluophor slurry having a common color (containing ZnO—Zn).

Figure 6A:
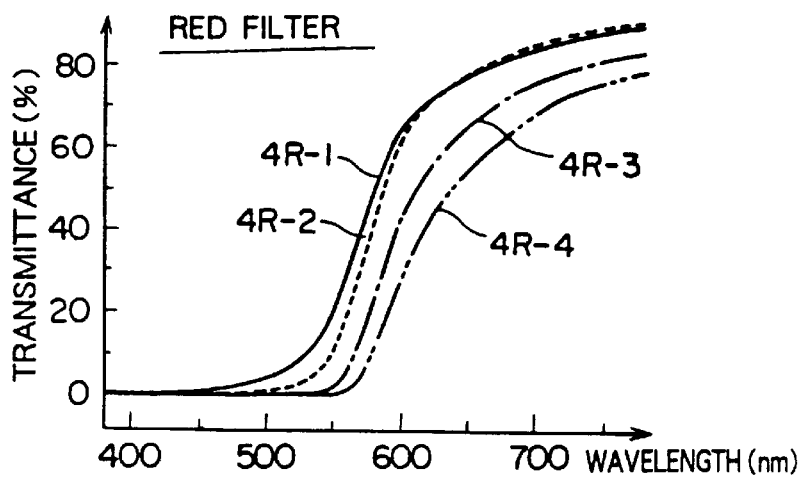
FIGS. 6A to 6C are graphs showing the transmittance characteristics of the color filter according to an embodiment of the present invention.
Figure 6B:
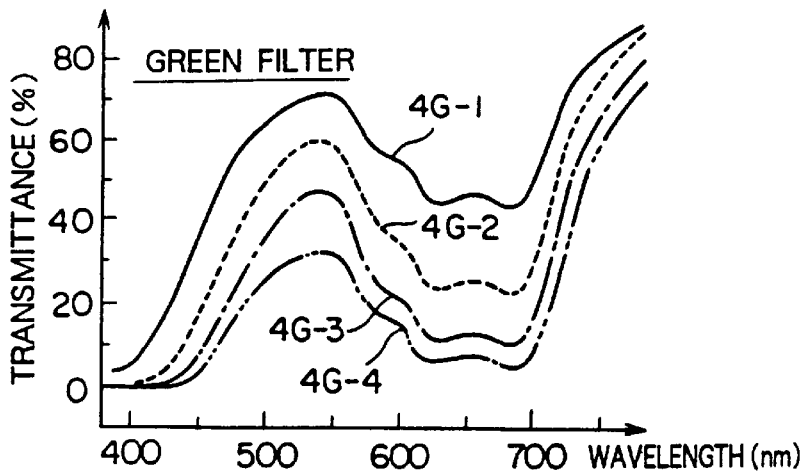
Figure 6C:
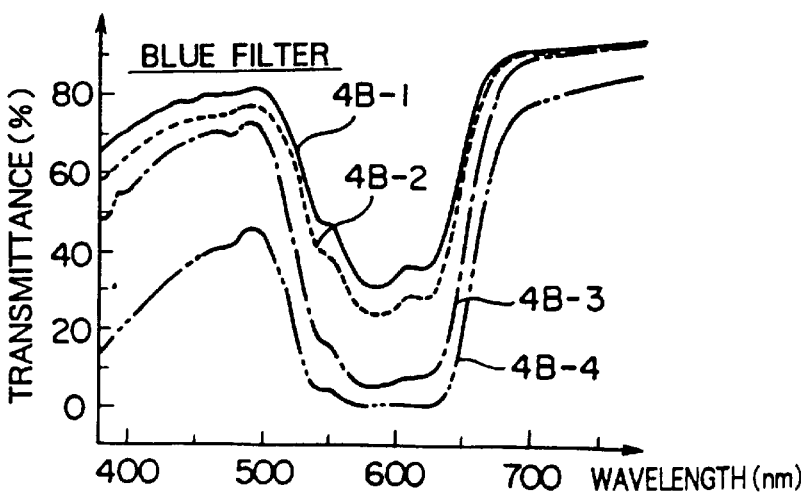

When four such fluophor surfaces were prepared and the transmittance was measured for the filters, the results shown in FIGS. 6A to 6C were obtained. FIG. 6A is a graph of the transmittances of red filters 4R-1 to 4R-4 of four samples, FIG. 6B is a graph of transmittances of green filters 4G-1 to 4G-4 of four samples, and FIG. 6C is a graph of transmittances of blue filters 4B-1 to 4B-4 of four samples. The percents of the transmittance, however, are the values where the transmittance in a case where the color filter is not formed is set as 100 percent.

Figure 7:
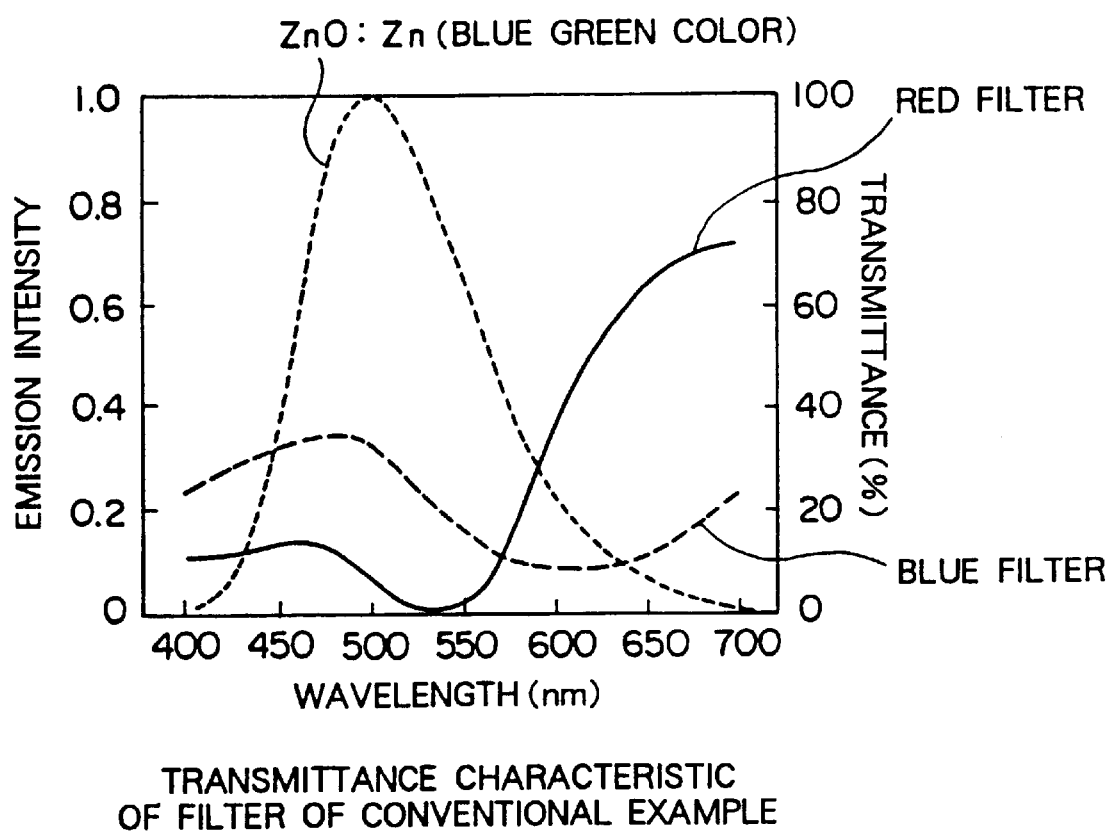
FIG. 7 is a graph showing the transmittance characteristic of a conventional color filter.

As apparent from the results shown in FIGS. 6A to 6C, it was confirmed that the color filters of the present example selectively allowed the lights of respective colors to pass therethrough in comparison with the color filter of the comparative example (conventional example) shown in FIG. 7.

Further, the panel glass formed in this way was installed in a CRT where the chromaticity point and the relative luminance were measured.

The chromaticity was measured by a Color Analyzer CA-100 made by Minolta Corp. The measurement conditions were an acceleration voltage of 27 kV and a cathode current of 300 μA. The luminance B was measured by a Color Analyzer CA-100 made by Minolta Corp. The measurement conditions were such that a white color of 9300 K was manifested in a state where the CRT was installed in the set (GDM 19 inches).

The results of the measurement are shown in the following Table 1 and FIG. 8A.

TABLE 1

| Filter film | Fluophor ZnO:Zn | | |
|---|---|---|---|
| | Chromaticity point | | Relative |
| | x | y | luminance |
| 4R-1 | 0.459 | 0.500 | 21% |
| 4R-2 | 0.512 | 0.470 | 15% |
| 4R-3 | 0.567 | 0.419 | 7% |
| 4R-4 | 0.595 | 0.389 | 4% |
| 4G-1 | 0.230 | 0.460 | 66% |
| 4G-2 | 0.220 | 0.503 | 52% |
| 4G-3 | 0.226 | 0.541 | 39% |
| 4G-4 | 0.225 | 0.585 | 24% |
| 4B-1 | 0.179 | 0.349 | 56% |
| 4B-2 | 0.171 | 0.340 | 50% |
| 4B-3 | 0.134 | 0.284 | 33% |
| 4B-4 | 0.116 | 0.280 | 16% |
| No filter | 0.228 | 0.394 | 100% |

Note: The relative luminance without a filter was set as 100 percent.

The relative luminance in the table is the value based on the value of no filter as 100 percent.

Figure 8A:
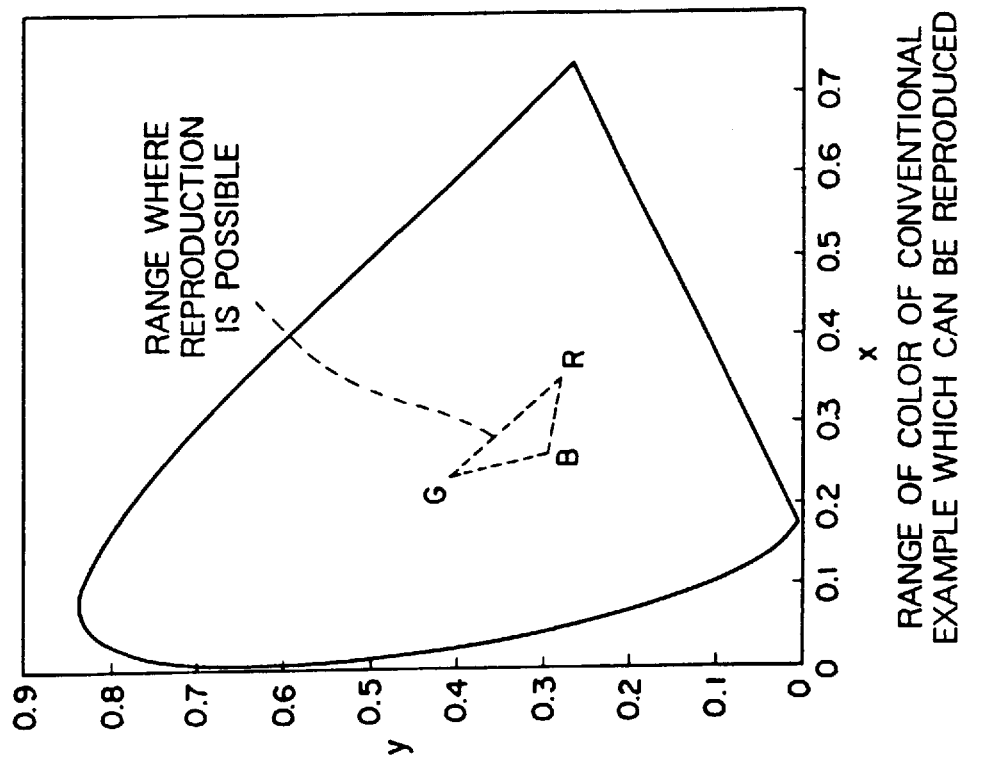
FIG. 8A is a graph showing a range of color of a CRT which can be reproduced using a color filter according to an embodiment of the present invention.
Figure 8B:
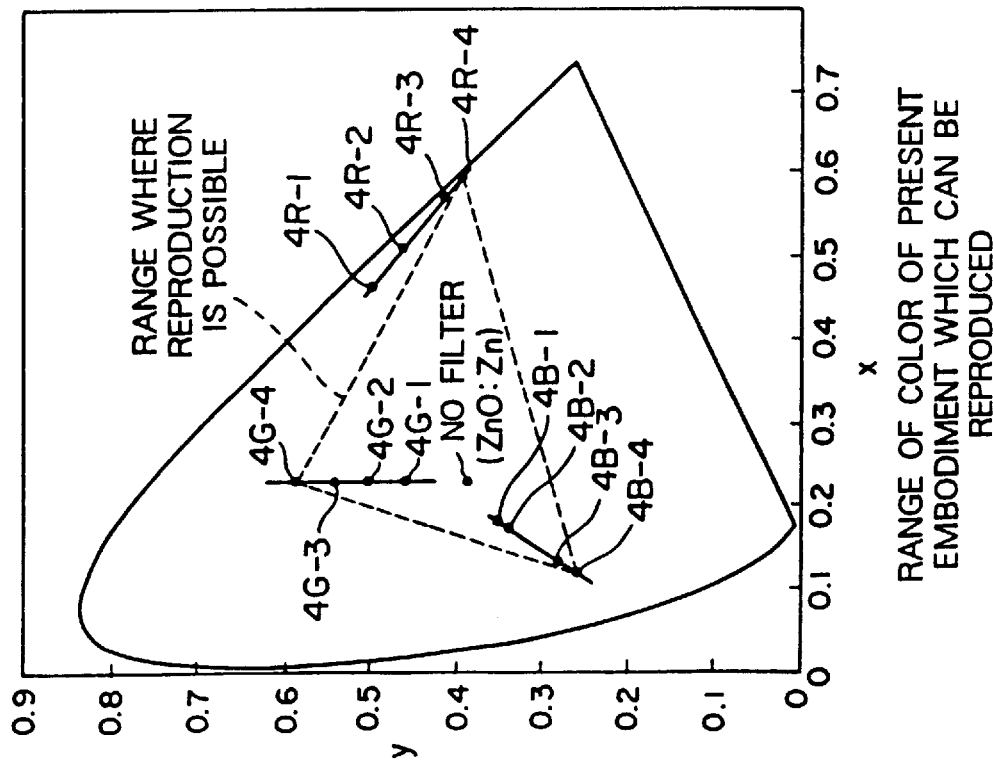
FIG. 8B is a graph showing the range of the color of a CRT which can be reproduced using a color filter according to a conventional example.

Further, for comparison, the results of measurement of the chromaticity by using a color filter according to the conventional example (one using a metal colloid and having a transmittance shown in FIG. 7) are shown in FIG. 8B.

As shown in Table 1 and FIG. 8A, it was confirmed that a CRT of a high luminance having a much wider color reproduction range than that of the conventional example could be realized in a CRT using the color filters according to the present example.

Further, when the contrast of the CRT of the present example was measured, it was confirmed that also the contrast was improved in comparison with that of the conventional example.

EXAMPLE 2

A CRT was produced in exactly the same way as that for above Example 1 except that a fluophor layer composed of $SnO_2$:Eu was formed in place of the fluophor layer composed of ZnO—Zn only on the red filters 4R-1 to 4R-4.

When the chromaticity point and the relative luminance were measured similar to Example 1, the results shown in Table 2 were obtained.

TABLE 2

| Filter film | Fluophor $SnO_2$:Eu | | |
|---|---|---|---|
| | Chromaticity point | | Relative |
| | x | y | luminance |
| 4R-1 | 0.598 | 0.401 | 60% |
| 4R-2 | 0.600 | 0.399 | 56% |
| 4R-3 | 0.607 | 0.393 | 37% |
| 4R-4 | 0.614 | 0.385 | 23% |

Note: The relative luminance without a filter was set as 100 percent.

As shown in Table 2, it was confirmed that, where a fluophor layer emitting red light is provided on the red filters 4R-1 to 4R-4, the relative luminance was further improved and the color reproduction range was increased over than that by the above Example 1.

EXAMPLE 3

In this example, a CRT was produced in the same way as the above Example 1 except the fluophor surface of the panel glass shown in FIG. 2 was formed by heat transfer printing and three primary color fluophor layer stripes were formed as the fluophor layers.

First, a transfer sheet was prepared. In order to prepare the transfer sheet, a screen five-color machine made by Taiho Kikai Corp. was used.

A peeling layer made of acrylic resin was printed on the entire surface of a polyester film equipment filter having a thickness of 25 µm, a light shielding frame using graphite was printed, and then fluophor slurries of B, R, and G were printed. As the fluophor slurries, well known slurries were used. Subsequently, the color filter use pigment paste used in the Example 1 was superimposed on the common color of the fluophor printing surface and the screen printing was carried out. Further, an acrylic heat sealing agent was printed on the entire surface to thereby prepare the fluophor transfer sheet equipped with the color filter.

This was superimposed on the glass surface so that the heat sealing agent side of this transfer sheet was in close contact with the inner surface of the panel glass. The heat transfer was carried out under the conditions of 150° C. by using a rotary type heat transfer machine made by Taihei Kogyo Corp. The color filter and the fluophor layer were thereby formed on the inner surface of the panel glass.

As explained above, according to the present invention, in the color display device, an increase of the luminance, an increase of the contrast, an increase of the color reproduction range, and an improvement of the ability to prevent reflection by outside light can be achieved.

What is claimed is:

1. A color filter composition comprising:
    fine particles of an inorganic metal oxide comprising 15 percent by weight or less of particles having a particle size of 0.1 µm or more based on the weight of all of the particles; and
    the fine particles further comprising at least 70 percent by weight green light transmissible particles of larger than 0.02 µm and smaller than 0.08 µm particle size or blue light transmissible particles of larger than 0.02 µm and smaller than 0.08 µm particle size,
    wherein a visible light transmittance of said color filter composition in a color filter after sintering is 50 percent or more.

2. A color filter composition as set forth in claim 1, further comprising a binder containing ethyl cellulose compounds and/or polyvinyl alcohol (PVA) compounds.

3. A color filter composition as set forth in claim 1, wherein the inorganic metal oxide contains at least one of iron oxide, titanium oxide, nickel oxide, cobalt oxide, zinc oxide, aluminum oxide and chromium oxide.

4. A color filter composition
    having a spectral characteristic allowing visible light to pass said color filter composition in the color filter, and
    comprising
    fine particles of an inorganic metal oxide comprising 15 percent by weight or less of particles having a particle size of 0.1 µm or more based on the weight of all of the particles and
    the fine particles further comprising at least 70 percent by weight or more of particles having a particle size of larger than 0.02 µm and smaller than 0.08 µm based on the weight of all of the particles, and
    a binder containing ethyl cellulose compounds and/or a binder containing polyvinyl alcohol (PVA) compounds.

5. A color filter composition as set forth in claim 4, wherein the fine particles comprise green light transmissible particles of larger than 0.02 μm and smaller than 0.08 μm particle size or blue light transmissible particles of larger than 0.02 μm and smaller than 0.08 μm particle size.

6. A color filter composition as set forth in claim 4, wherein, a light transmittance of a specific light transmission region of the visible region of said color filter composition in a color filter after sintering is 50 percent or more.

7. A color filter composition as set forth in claim 4, wherein the inorganic metal oxide contains at least one of iron oxide, titanium oxide, nickel oxide, cobalt oxide, zinc oxide, aluminum oxide and chromium oxide.

8. A pigment paste composition comprising fine particles of an inorganic metal oxide containing 15 percent by weight or less of particles having a particle size of 0.1 μm or more based on the weight of all of the particles and containing 70 percent by weight or more of green light transmissible particles having a particle size of larger than 0.02 μm and smaller than 0.08 μm based on the weight of all of the particles, and a binder containing ethyl cellulose compounds and/or a binder containing polyvinyl alcohol (PVA) compounds wherein a light transmittance of a specific light transmission region of a visible region of said pigment paste composition is to be 50 percent or more after heat processing.

9. A pigment paste composition as set forth in claim 8, wherein the inorganic metal oxide contains at least one of iron oxide, titanium oxide, nickel oxide, cobalt oxide, zinc oxide, aluminum oxide and chromium oxide.

10. A pigment paste composition comprising fine particles of an inorganic metal oxide containing 15 percent by weight or less of particles having a particle size of 0.1 μm or more based on the weight of all of the particles and containing 70 percent by weight or more of blue light transmissible particles having a particle size of larger than 0.02 μm and smaller than 0.08 μm based on the weight of all of the particles, and a binder containing ethyl cellulose compounds and/or a binder containing polyvinyl alcohol (PVA) compounds wherein a light transmittance of a specific light transmission region of a visible region of said pigment paste composition is to be 50 percent or more after heat processing.

11. A pigment paste composition as set forth in claim 10, wherein the inorganic metal oxide contains at least one of iron oxide, titanium oxide, nickel oxide, cobalt oxide, zinc oxide, aluminum oxide and chromium oxide.

* * * * *